(No Model.)
J. W. GREEN.
HORSE BREAKING APPARATUS.
No. 545,228.    Patented Aug. 27, 1895.
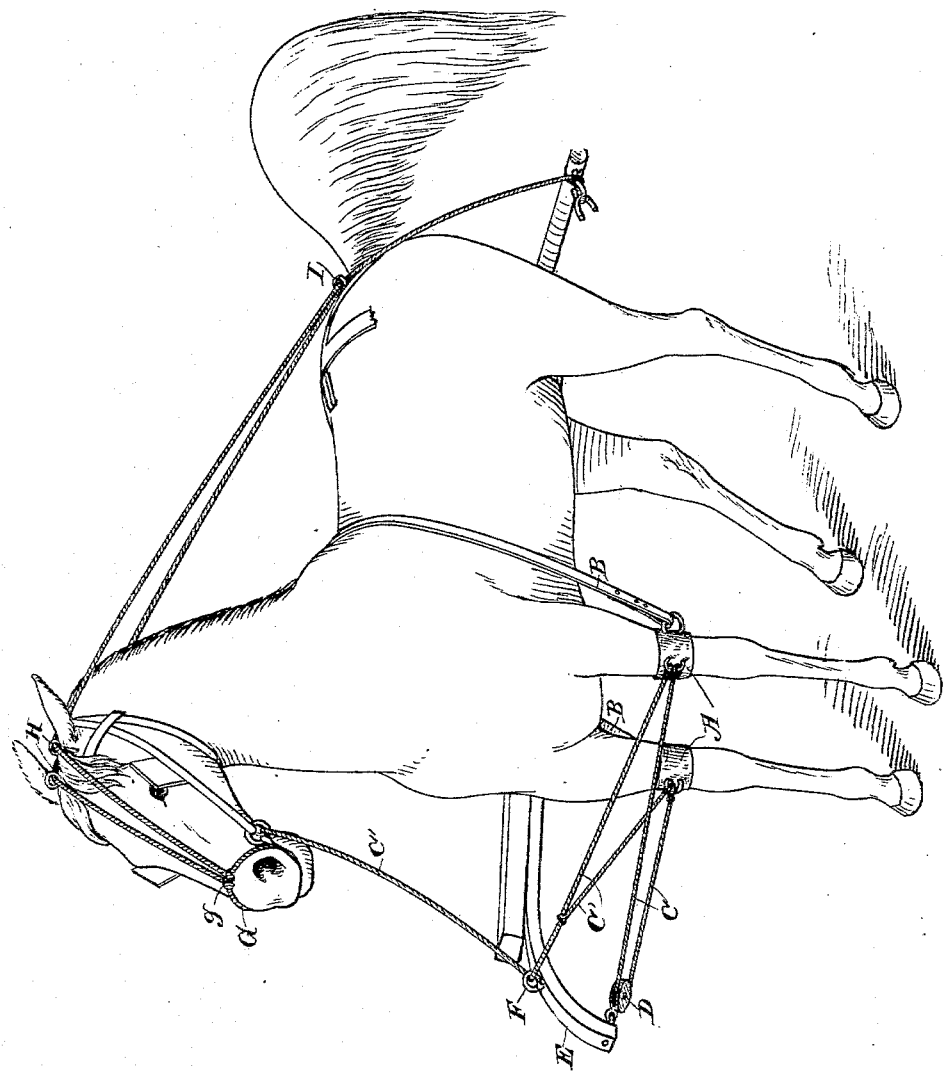
Witnesses:
Inventor,
John W. Green

UNITED STATES PATENT OFFICE.

JOHN W. GREEN, OF COTATI, CALIFORNIA.

HORSE-BREAKING APPARATUS.

SPECIFICATION forming part of Letters Patent No. 545,228, dated August 27, 1895.

Application filed April 22, 1895. Serial No. 546,737. (No model.)

*To all whom it may concern:*

Be it known that I, JOHN W. GREEN, a citizen of the United States, residing at Cotati, county of Sonoma, State of California, have invented an Improvement in Horse-Breaking Apparatus; and I hereby declare the following to be a full, clear, and exact description of the same.

My invention relates to an apparatus which is designed for the purpose of breaking and taming horses and correcting bad habits.

It consists in an arrangement of straps or cords and in certain details of construction, which will be more fully explained by reference to the accompanying drawing, in which the figure illustrates the construction and operation of my apparatus as applied to a horse.

Some of the faults of horses are refusal to move, called "balkiness," tendency to kick if forced to move, and what is known as "halter-pulling." My invention is designed to correct these faults and also to assist in breaking young horses to harness.

In applying my apparatus straps or bands A are fixed around the front legs of the horse at or about the knee, and are supported so that they will not slip down by means of a strap B, which passes over the back or withers, as shown. When the horse is harnessed to a wagon, the straps A are connected together by a rope C, which passes through a guide or pulley D, fixed at the front end of a tongue E, which may be an extension of the main wagon-tongue, or otherwise properly arranged to give a sufficient distance between the horse's legs and the pulley around which the rope passes. With this construction, whenever the horse walks or trots properly, the rope will move backward and forward around the pulley as the legs alternately move forward in traveling and will offer no impediment to a proper movement. If, however, the horse attempts to set back and "balk," as it is commonly known, the movement of the other horse keeps the wagon in motion, and the power of the rope C will then be applied to pull the knees of the horse forward, and as this is the point where the horse has the least power of resistance, he will be obliged to step in order to preserve his balance and prevent being thrown down. If desired, an additional rope C' may be attached to the knee-bands, and passing through a ring F upon the tongue, it may lead back to the bridle or a halter-strap, and in some cases it will be found that this rope alone will prevent the horse from pulling back. The same construction as last described may also be applied to the stall in which the horse is ordinarily fastened, the ring F being secured to the manger or other fixed point, and the rope leading from the knee-bands passing through this ring and attached to the halter-strap or head-stall. If the horse then attempts to pull back, the pull upon the halter will be conveyed to the knee-bands and will pull his legs from under him or cause him to cease pulling.

In many cases where a balky horse is attached to a vehicle, if he is by any means forced to move he will at once commence kicking, and in order to prevent this I employ a rope G, which is put around the upper jaw with a knot g or enlargement upon the top of the nose, as shown, extending thence up through rings or guides H at the top of the head-stall. From this point the two parts of the rope lead back through a suitable guide or guides at I over the hips of the horse, and the rope leads thence down to the singletree, to which the horse is attached, being there secured. The knot or enlargement g, which is made in the rope at the point where the two parts meet over the nose, is so fixed as to press upon the sensitive portion at that point, and if, then, the horse be started by the movement of the other horse, any attempt to kick will, by raising the hindquarters, bring a pull upon the rope which presses the knot upon the sensitive portion of the nose. At the same time, the pull upon the ropes which are attached to the horse's legs will take away his support at this point and will prevent any further attempt at kicking as long as he is in motion.

For young horses who are just being broken to harness, and who have not yet learned what is expected of them, this apparatus is especially valuable.

The ropes attached to the knee-bands are shortenened up enough so that the traces by which the horse draws are kept reasonably tight. The first forward movement of the wagon causes the horse to step as the pull upon his knees will prevent his standing still or pulling back, and he will thus soon learn that by constant alternate stepping with his feet he will be put to no inconvenience, and if he has any tendency to kick this will be checked at once, as before described.

The same apparatus is valuable to hold a horse to his position if he becomes frightened, and so make him stand and look at the terrifying object until he becomes accustomed to it.

Having thus described my invention, what I claim as new, and desire to secure by Letters Patent, is—

1. In an apparatus for breaking and taming horses, a rope to be secured around the upper jaw of the horse, having a knot or protuberance to press over the front of the nose, and guides through which said rope is led over the top of the head and the hips of the horse, said rope having its rear end adapted to be secured to a part of the vehicle whereby the raising of the hind quarters of the horse will bring a pull upon the rope and cause the knot or protuberance to press upon the nose of the horse.

2. An apparatus for breaking or taming horses, consisting of knee-bands connected with the front legs of the horse and ropes leading from the bands and connected with the head stall, in combination with the rope secured around the upper jaw having a knot or protuberance pressing over the front of the nose, guides through which said rope is led over the top of the head and the hips of the horse to a point of attachment upon the singletree or other part of the wagon.

In witness whereof I have hereunto set my hand.

JOHN W. X GREEN.
his mark

Witnesses:
S. H. NOURSE,
GEO. H. STRONG.